United States Patent
Sugiura et al.

(10) Patent No.: US 9,373,985 B2
(45) Date of Patent: Jun. 21, 2016

(54) STATOR FOR ROTATING ELECTRIC MACHINE

(71) Applicant: DENSO CORPORATION, Kariya, Aichi-pref. (JP)

(72) Inventors: Shinsuke Sugiura, Nishio (JP); Yuki Takahashi, Obu (JP); Masahiro Seguchi, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/314,502

(22) Filed: Jun. 25, 2014

(65) Prior Publication Data

US 2014/0375156 A1  Dec. 25, 2014

(30) Foreign Application Priority Data

Jun. 25, 2013  (JP) .................................. 2013-132708

(51) Int. Cl.
| | |
|---|---|
| *H02K 3/50* | (2006.01) |
| *H02K 3/12* | (2006.01) |
| *H02K 3/28* | (2006.01) |
| *H02K 3/38* | (2006.01) |
| *H02K 3/52* | (2006.01) |

(52) U.S. Cl.
CPC .. *H02K 3/50* (2013.01); *H02K 3/12* (2013.01); *H02K 3/28* (2013.01); *H02K 3/38* (2013.01); *H02K 3/52* (2013.01); *H02K 3/522* (2013.01)

(58) Field of Classification Search
CPC ............. H02K 3/28; H02K 3/38; H02K 3/50; H02K 3/52; H02K 3/522; H02K 3/12
USPC .............................. 310/71, 208, 234, 205, 206
See application file for complete search history.

(56) References Cited

U.S. PATENT DOCUMENTS 5,900,687 A * 5/1999 Kondo et al. ................... 310/71
7,205,689 B2 * 4/2007 Lukenich ........................ 310/71

(Continued)

FOREIGN PATENT DOCUMENTS

| JP | 2004-120905 | 4/2004 |
| JP | 2006-033964 | 2/2006 |

(Continued)

OTHER PUBLICATIONS

Office Action (2 pgs.) dated Jun. 18, 2015 issued in corresponding Japanese Application No. 2013-132708 with at an least partial English-language translation (2 pgs.).

*Primary Examiner* — Terrance Kenerly
*Assistant Examiner* — Alexander Singh
(74) *Attorney, Agent, or Firm* — Nixon & Vanderhye P.C.

(57) ABSTRACT

A stator includes an annular stator core and a three-phase stator coil. The stator coil is comprised of a plurality of star-connected phase windings. The stator coil further has a plurality of interphase bridging wires to electrically connect neutral point-side ends of the phase windings to each other. The interphase bridging wires are arranged on a coil end of the stator coil. At least one of the interphase bridging wires is made up of at least one busbar. The busbar includes three or four connecting end portions each having a joining surface joined to one of the phase windings, other bridging wires and other busbars. The connecting end portions are arranged so that some of the joining surfaces of the connecting end portions face substantially in the circumferential direction of the stator core, while the other joining surfaces face substantially in a radial direction of the stator core.

3 Claims, 10 Drawing Sheets

(56) References Cited

U.S. PATENT DOCUMENTS

2003/0201688 A1* 10/2003 Yamamura et al. ........... 310/216
2011/0297474 A1* 12/2011 Aono et al. .................. 180/443
2014/0183993 A1    7/2014 Takasaki

FOREIGN PATENT DOCUMENTS

| JP | 2010-233327 | 10/2010 |
|----|-------------|---------|
| WO | 2013/042248 | 3/2013  |

* cited by examiner

STATOR FOR ROTATING ELECTRIC MACHINE

CROSS-REFERENCE TO RELATED APPLICATION

This application is based on and claims priority from Japanese Patent Application No. 2013-132708, filed on Jun. 25, 2013, the content of which is hereby incorporated by reference in its entirety into this application.

BACKGROUND

1. Technical Field

The present invention relates to stators for rotating electric machines that are used in, for example, motor vehicles as electric motors and electric generators.

2. Description of Related Art

There are known stators for rotating electric machines which include an annular stator core and a three-phase stator coil. The stator core has a plurality of slots arranged in its circumferential direction. The stator coil is comprised of a plurality of phase windings. The phase windings are mounted on the stator core so as to be partially received in the slots of the stator core. In addition, those parts of the phase windings which are located outside the slots of the stator core together make up a pair of coil ends of the stator coil which respectively protrude from an opposite pair of axial end faces of the stator core.

Moreover, the phase windings of the stator coil may be star-connected to define a neutral point therebetween. In this case, it is necessary to connect ends of the phase windings at the neutral point by, for example, welding. To this end, a plurality of long bridging wires may be employed; the bridging wires extend on one of the coil ends of the stator coil so as to bridge the phase windings. Alternatively, as disclosed in, for example, Japanese Patent Application Publication No. JP2004120905A, a busbar may be employed; the busbar is arranged on one of the coil ends of the stator coil so as to have the ends of phase windings connected thereto.

However, during operation of the rotating electric machine, the stator is generally subjected to both circumferential vibration caused by rotation of a rotor of the machine and radial vibration caused by imbalance of the rotor. Consequently, in the case of employing the long bridging wires, the influence of the vibrations on the stator coil will be increased due to the long-distance extending of the bridging wires on the coil end of the stator coil. On the other hand, in the case of employing the busbar, the influence of the vibrations on the stator coil will also be increased by the weight of the busbar.

SUMMARY

According to exemplary embodiments, there is provided a stator for a rotating electric machine. The stator includes an annular stator core and a three-phase stator coil. The stator core has a plurality of slots arranged in a circumferential direction of the stator core. The stator coil is comprised of a plurality of phase windings that are star-connected to define at least one neutral point therebetween. The phase windings are partially received in the slots of the stator core so that parts of the phase windings are located outside the slots to make up a pair of coil ends of the stator coil. The coil ends protrude respectively from an opposite pair of axial end faces of the stator core. The stator coil further has a plurality of interphase bridging wires to electrically connect neutral point-side ends of the phase windings to each other. The interphase bridging wires being arranged on one of the coil ends of the stator coil. At least one of the interphase bridging wires is made up of at least one busbar. The busbar is configured to include three or four connecting end portions each having a joining surface joined to one of the phase windings, other bridging wires and other busbars. The connecting end portions are arranged so that some of the joining surfaces of the connecting end portions face substantially in the circumferential direction of the stator core, while the other joining surfaces face substantially in a radial direction of the stator core.

With the above configuration, it is possible to damp both circumferential vibration applied to the stator due to rotation of a rotor of the rotating electric machine and radial vibration applied to the stator due to unbalance of the rotor. Consequently, it is possible to secure high resistance of the stator coil to both the circumferential and radial vibrations.

It is preferable that the three or four connecting end portions include a pair of the connecting end portions which are arranged so as to have their respective joining surfaces facing away from each other substantially in one of the circumferential and radial directions of the stator core.

In one exemplary embodiment, the busbar is configured to include first and second pairs of the connecting end portions. The first pair of the connecting end portions are arranged so as to have their respective joining surfaces facing away from each other substantially in the circumferential direction of the stator core. The second pair of the connecting end portions are arranged so as to have their respective joining surfaces facing away from each other substantially in the radial direction of the stator core.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
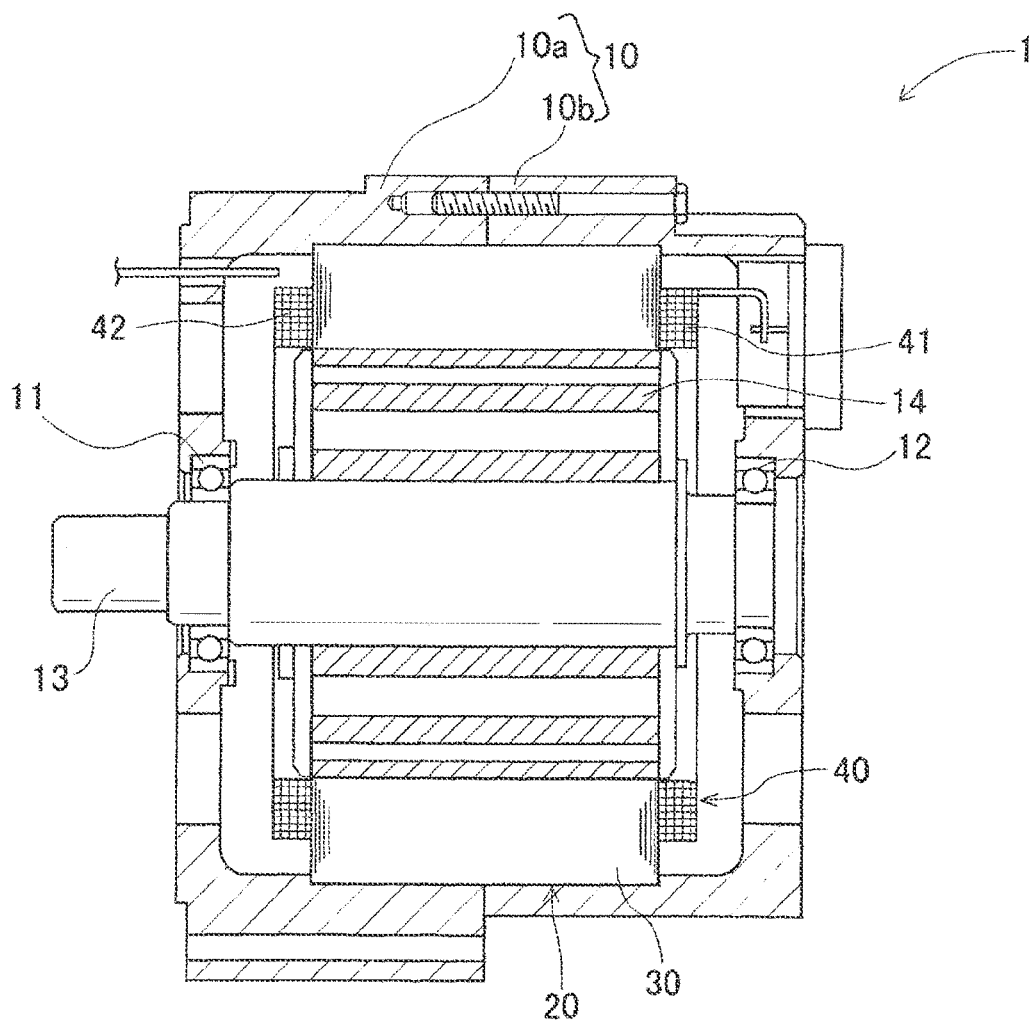
FIG. 1 is a schematic cross-sectional view of a rotating electric machine which includes a stator according to a first embodiment.

Exemplary embodiments will be described hereinafter with reference to FIGS. 1-13. It should be noted that for the sake of clarity and ease of understanding, identical components having identical functions throughout the whole description have been marked, where possible, with the same reference numerals in each of the figures and that for the sake of avoiding redundancy, explanations of the identical components will not be repeated.

First Embodiment

FIG. 1 shows the overall configuration of a rotating electric machine 1 which includes a stator 20 according to a first embodiment.

The rotating electric machine 1 is designed to be used in a motor vehicle, such as a passenger car or truck, as an electric motor.

As shown in FIG. 1, the rotating electric machine 1 further includes a housing 10 and a rotor 14 in addition to the stator 20. The housing 10 is comprised of a pair of cup-shaped housing pieces 10a and 10b which are jointed together at the open ends thereof. The housing 10 has a pair of bearings 11 and 12 mounted therein, via which a rotating shaft 13 is rotatably supported by the housing 10. The rotor 14 is received in the housing 10 and fixed on the rotating shaft 13. The stator 20 is fixed in the housing 10 so as to surround the radially outer periphery of the rotor 14.

The rotor 14 includes a plurality of permanent magnets that form a plurality of magnetic poles on the radially outer periphery of the rotor 14 facing the radially inner periphery of the stator 20. The polarities of the magnetic poles alternate between north and south in the circumferential direction of the rotor 14. The number of the magnetic poles can be suitably set according to the design specification of the rotating electric machine 1. In the present embodiment, the number of the magnetic poles is set to be equal to, for example, eight (i.e., four north poles and four south poles).

Figure 2:
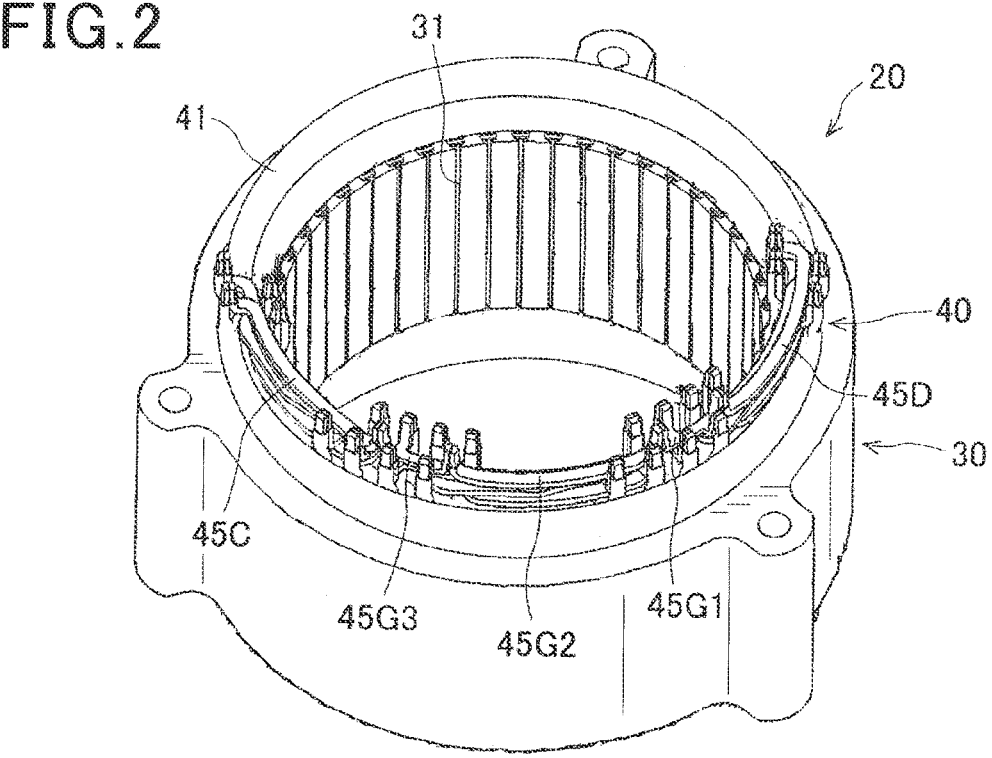
FIG. 2 is a perspective view of the stator according to the first embodiment omitting part of a coil end of a stator coil of the stator.
Figure 3:
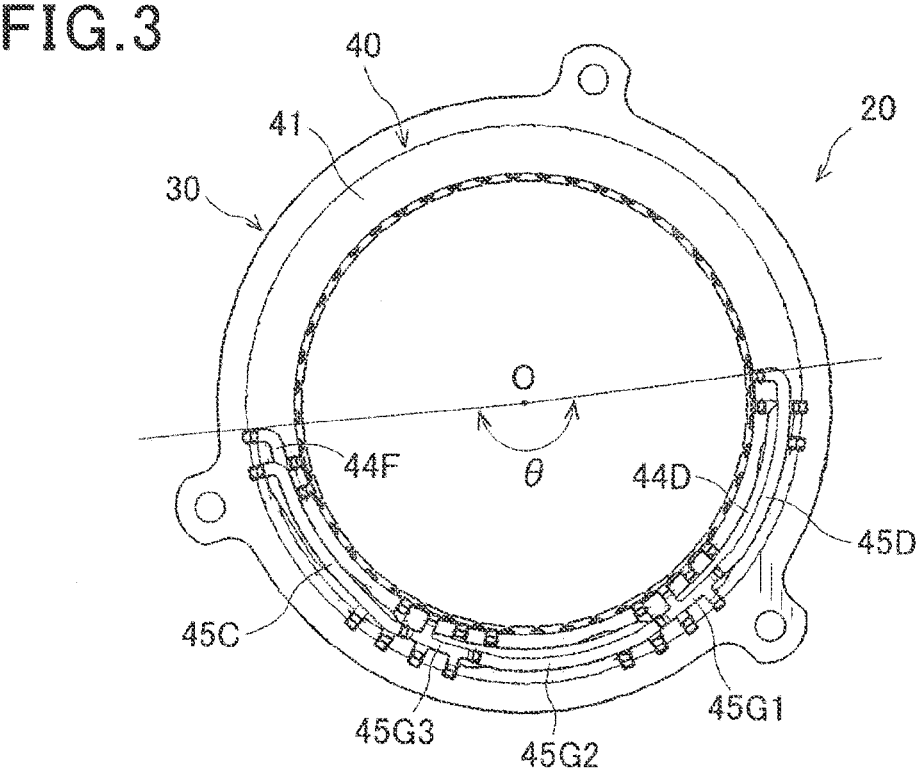
FIG. 3 is a plan view of the stator according to the first embodiment omitting part of the coil end of the stator coil.

Referring now to FIGS. 2 and 3, the stator 20 includes an annular (or hollow cylindrical) stator core 30, which is disposed radially outside the rotor 14 so as to surround the rotor 14, and a three-phase stator coil 40 mounted on the stator core 30. In addition, the stator 20 may further have insulating paper interposed between the stator core 30 and the stator coil 40.

In the present embodiment, the stator core 30 is formed by laminating a plurality of annular magnetic steel sheets in the axial direction of the stator core 30 and fixing them together by, for example, staking. In addition, between each adjacent pair of the magnetic steel sheets, there is interposed an insulating film. It should be appreciated that other conventional metal sheets may also be used instead of the magnetic steel sheets.

Moreover, as shown in FIGS. 2 and 3, the stator core 30 has a plurality of slots 31 formed in the radially inner surface thereof. The slots 31 extend in the axial direction of the stator core 30 so as to axially penetrate the stator core 30 and are spaced from one another at equal intervals in the circumferential direction of the stator core 30. Moreover, for each of the slots 31, the depth direction of the slot 31 coincides with a radial direction of the stator core 30.

In the present embodiment, there are provided two slots 31 per magnetic pole of the rotor 14 that has the eight magnetic poles and per phase of the three-phase stator coil 40. Accordingly, the total number of the slots 31 provided in the stator core 30 is equal to 48 (i.e., 2×8×3).

Figure 4A:
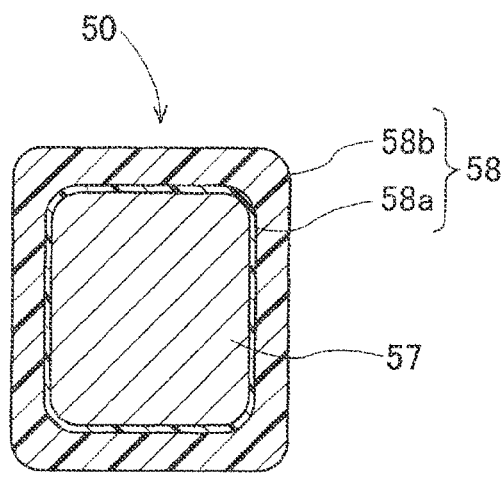
FIG. 4A is a cross-sectional view illustrating the configuration of electric wires forming the stator coil.

The stator coil 40 is formed of a plurality of electric wires 50 mounted on the stator core 30. Each of the electric wires 50 is configured with, as shown in FIG. 4A, an electric conductor 57 and an insulating coat 58 that covers the outer surface of the electric conductor 57.

In the present embodiment, the electric conductor 57 is made of copper and has a substantially rectangular cross section perpendicular to its longitudinal axis. The insulating coat 58 is two-layer structured to include an inner layer 58a and an outer layer 58b. The thickness of the insulating coat 58 (i.e., the sum of thicknesses of the inner and outer layers 58a and 58b) is set to be in the range of 100 to 200 μm.

With such a large thickness of the two-layer structured insulating coat 58, it is possible to reliably insulate the electric wires 50 from one another without interposing insulating paper therebetween. However, it is also possible to interpose insulating paper between the electric wires 50 so as to further enhance the electrical insulation therebetween.

Further, the outer layer 58b is made of an insulating material such as nylon. The inner layer 58a is made of a thermoplastic resin having a higher glass transition temperature than the outer layer 58b or an insulating material having no glass transition temperature such as a polyimide-imide resin. Consequently, the outer layer 58b will be softened by heat generated in the rotating electric machine 1 earlier than the inner layer 58a. As a result, those portions of the electric wires 50 which are received in the same ones of the slots 31 of the stator core 30 will be integrated into a rigid body, thereby enhancing the mechanical strength thereof. Moreover, when the stator coil 40 is subjected to excessive vibration, the adhesion between the inner and outer layers 58a and 58b will be broken down earlier than the adhesion between the inner layer 58a and the electric conductor 57, thereby keeping the electric conductor 57 covered and thus electrically insulated by the inner layer 58a.

Figure 4B:
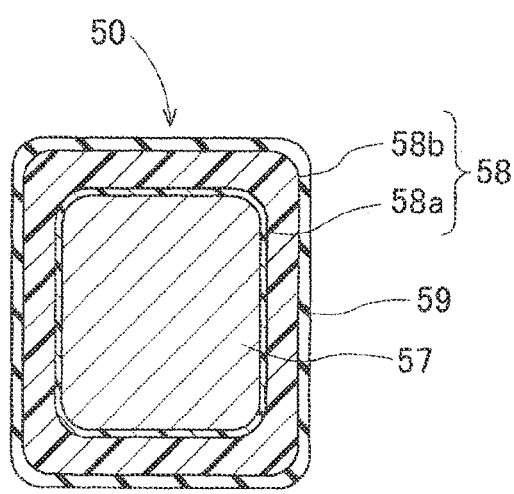
FIG. 4B is a cross-sectional view illustrating a modification of the configuration of the electric wires shown in FIG. 4A.

Furthermore, as shown in FIG. 4B, it is also possible for each of the electric wires 50 to further include a fusible coat 59 to cover the outer surface of the insulating coat 58; the fusible coat 59 may be made, for example, of epoxy resin. In this case, the fusible coats 59 of the electric wires 50 will be fused by heat generated in the rotating electric machine 1 earlier than the insulating coats 58, thereby bonding together those portions of the electric wires 50 which are received in the same ones of the slots 31 of the stator core 30. As a result, those portions of the electric wires 50 will be integrated into a rigid body, thereby enhancing the mechanical strength thereof. In addition, the outer layers 58b of the insulating coats 58 of the electric wires 50 may also be made of PPS (polyphenylene sulfide).

Moreover, each of the electric wires 50 forming the stator coil 40 is wave-shaped (or wave-wound around the stator core 30) to include a plurality of straight in-slot portions and a plurality of turn portions. Each of the in-slot portions is received in a corresponding one of the slots 31 of the stator core 30. Each of the turn portions is located outside the slots 31 of the stator core 30 and connects a corresponding adjacent pair of the in-slot portions.

More specifically, in the present embodiment, for each of the electric wires 50, the in-slot portions of the electric wire 50 are received in the corresponding slots 31 of the stator core 30 which are circumferentially spaced from one another at, for example, a six-slot pitch (i.e., 3 (the number of phases)×2 (the slot multiplier number)=6). Moreover, all the turn portions of the electric wires 50 which protrude outside of the slots 31 from one axial end face (i.e., the right end face in FIG. 1) of the stator core 30 together make up an annular first coil end 41 of the stator coil 40. On the other hand, all the turn portions of the electric wires 50 which protrude outside of the slots 31 from the other axial end face (i.e., the left end face in FIG. 1) of the stator core 30 together make up an annular second coil end 42 of the stator coil 40. That is, the stator coil 40 has the pair of first and second coil ends 41 and 42 respectively protruding from the opposite pair of axial end faces of the stator core 30.

Figure 5:
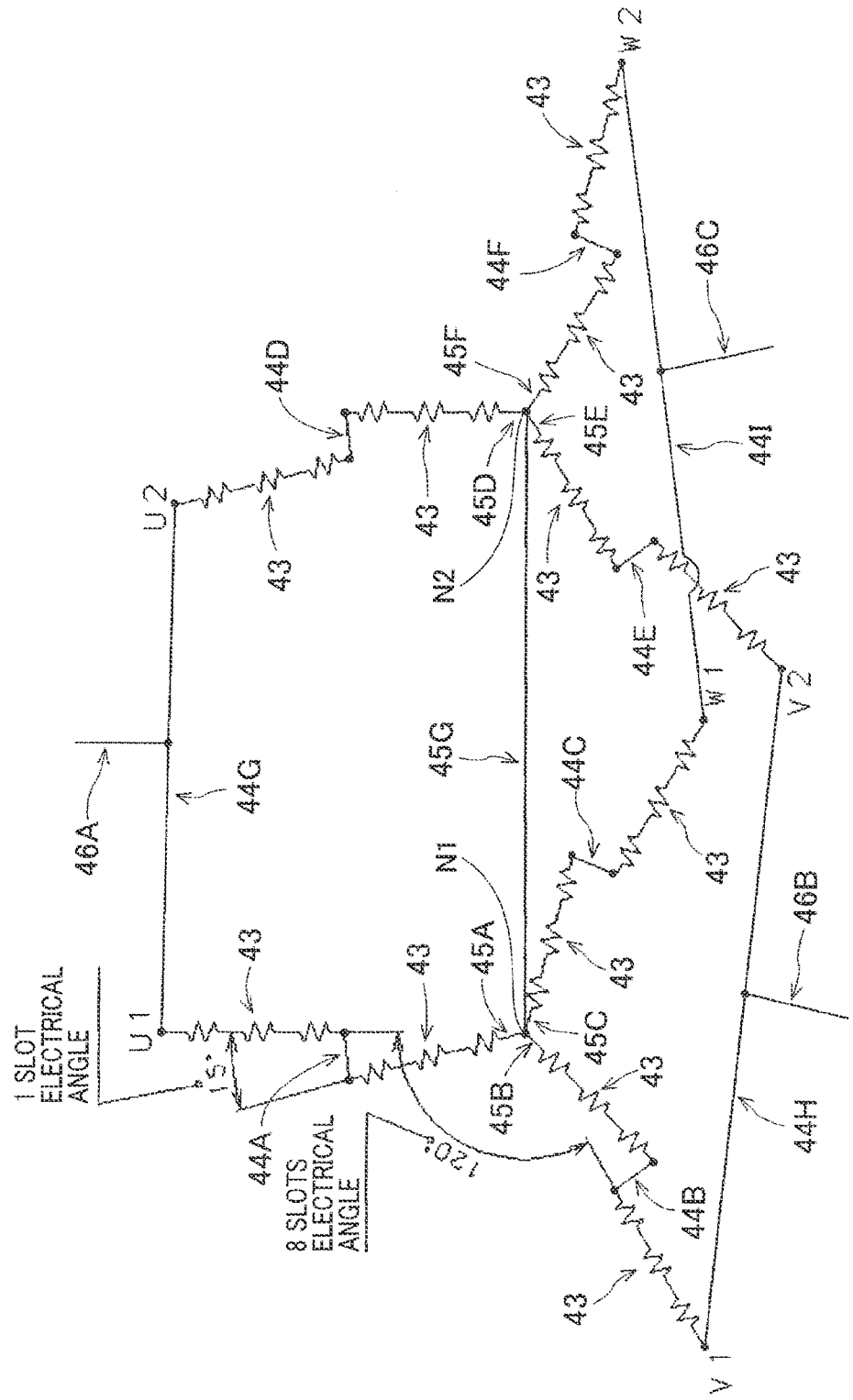
FIG. 5 is a schematic circuit diagram of the stator according to the first embodiment.

As shown in FIG. 5, in the present embodiment, the stator coil 40 is comprised of first and second winding sets.

The first winding set consists of a U-phase winding U1, a V-phase winding V1 and a W-phase winding W1, which are star-connected to define a neutral point N1 therebetween. The U-phase, V-phase and W-phase windings U1, V1 and W1 are different in phase from each other by 120° in electrical angle (or by 8 slots). Moreover, each of the U-phase, V-phase and W-phase windings U1, V1 and W1 is comprised of a plurality of winding segments 43, more particularly of two winding segments 43 in the present embodiment. The two winding segments 43 are offset from each other by, for example, 15° in electrical angle (or by 1 slot).

Similarly, the second winding set consists of a U-phase winding U2, a V-phase winding V2 and a W-phase winding W2, which are star-connected to define a neutral point N2 therebetween. The U-phase, V-phase and W-phase windings U2, V2 and W2 are different in phase from each other by 120° in electrical angle. Moreover, each of the U-phase, V-phase and W-phase windings U2, V2 and W2 is comprised of a plurality of winding segments 43, more particularly of two winding segments 43 in the present embodiment. The two winding segments 43 are offset from each other by, for example, 15° in electrical angle.

That is, in the present embodiment, each of the U, V and W phases of the stator coil 40 is made up of four winding segments 43.

Moreover, in the present embodiment, the stator coil 40 has a plurality of intraphase bridging wires 44A-44I each of which bridges (or extends to connect) a corresponding pair of the winding segments 43 belonging to a same one of the U, V and W phases.

Specifically, the intraphase bridging wire 44A bridges the two winding segments 43 of the U-phase winding U1 in the first winding set. The intraphase bridging wire 44B bridges the two winding segments 43 of the V-phase winding V1 in the first winding set. The intraphase bridging wire 44C bridges the two winding segments 43 of the W-phase winding W1 in the first winding set. The intraphase bridging wire 44D bridges the two winding segments 43 of the U-phase winding U2 in the second winding set. The intraphase bridging wire 44E bridges the two winding segments 43 of the V-phase winding V2 in the second winding set. The intraphase bridging wire 44F bridges the two winding segments 43 of the W-phase winding W2 in the second winding set.

Moreover, the intraphase bridging wire 44G bridges the output-side winding segment 43 of the U-phase winding U1 in the first winding set and the output-side winding segment 43 of the U-phase winding U2 in the second winding set. The intraphase bridging wire 44H bridges the output-side winding segment 43 of the V-phase winding V1 in the first winding set and the output-side winding segment 43 of the V-phase winding V2 in the second winding set. The intraphase bridging wire 44I bridges the output-side winding segment 43 of the W-phase winding W1 in the first winding set and the output-side winding segment 43 of the W-phase winding W2 in the second winding set.

Further, the intraphase bridging wire 44G is electrically connected with an output lead wire 46A. The intraphase bridging wire 44H is electrically connected with an output lead wire 46B. The intraphase bridging wire 44I is electrically connected with an output lead wire 46C.

Furthermore, in the present embodiment, the stator coil 40 also has a plurality of interphase bridging wires 45A-45G for electrically connecting neutral point-side ends of the phase windings U1-W1 and U2-W2 to each other.

Specifically, the interphase bridging wire 45A electrically connects the neutral point-side end of the neutral point-side wire segment 43 of the U-phase winding U1 to the neutral point N1 in the first winding set. The interphase bridging wire 45B electrically connects the neutral point-side end of the neutral point-side wire segment 43 of the V-phase winding V1 to the neutral point N1 in the first winding set. The interphase bridging wire 45C electrically connects the neutral point-side end of the neutral point-side wire segment 43 of the W-phase winding W1 to the neutral point N1 in the first winding set. The interphase bridging wire 45D electrically connects the neutral point-side end of the neutral point-side wire segment 43 of the U-phase winding U2 to the neutral point N2 in the second winding set. The interphase bridging wire 45E electrically connects the neutral point-side end of the neutral point-side wire segment 43 of the V-phase winding V2 to the neutral point N2 in the second winding set. The interphase bridging wire 45F electrically connects the neutral point-side end of the neutral point-side wire segment 43 of the W-phase winding W2 to the neutral point N2 in the second winding set. The interphase bridging wire 45G electrically connects the neutral point N1 in the first winding set to the neutral point N2 in the second winding set.

In addition, in the present embodiment, the electrical connection between the winding segments 43 of the phase windings U1-W1 and U2-W2, the intraphase bridging wires 44A-44I and the interphase bridging wires 45A-45G is made by, for example, welding.

Figure 6:
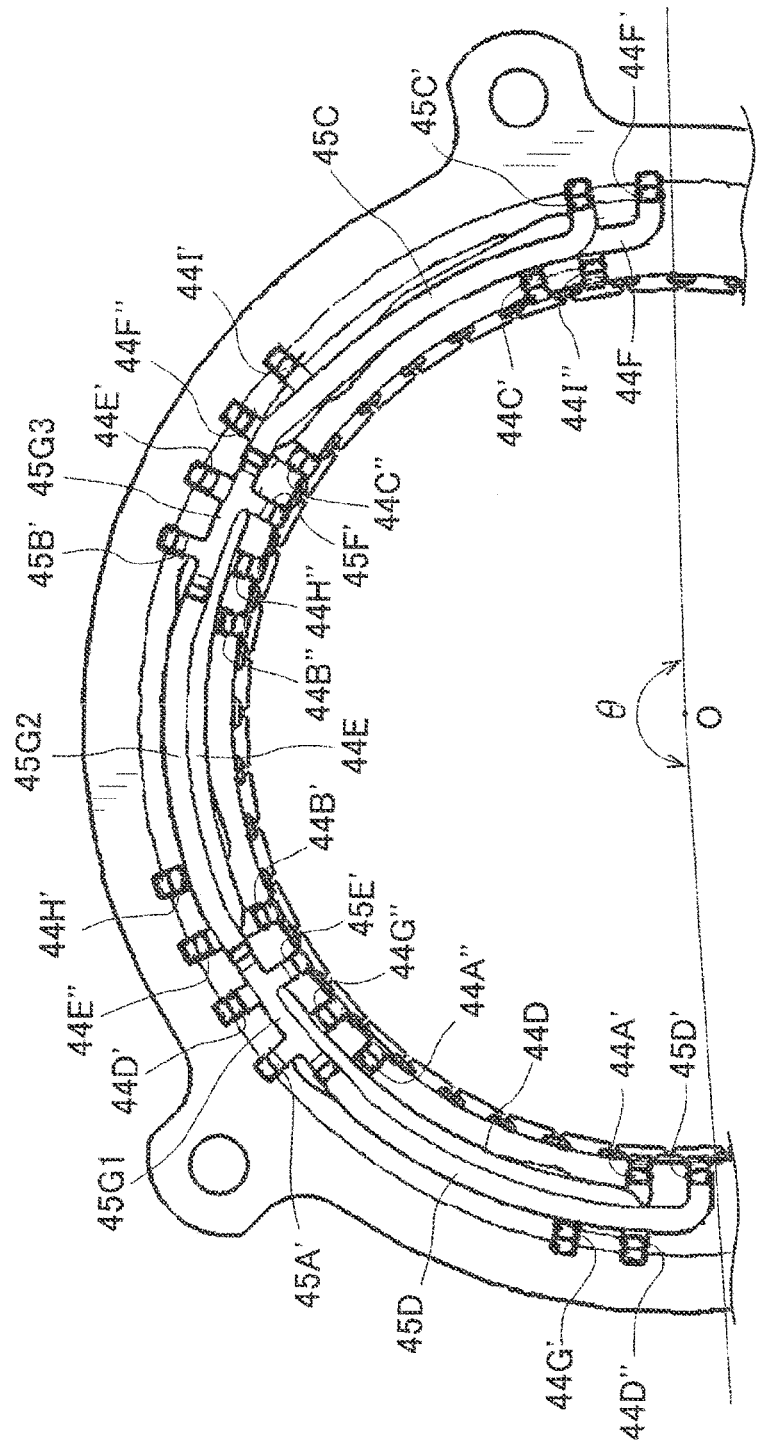
FIG. 6 is a plan view of part of the stator according to the first embodiment.

Moreover, in the present embodiment, the intraphase bridging wires 44A-44I and the interphase bridging wires 45A-45G are made up of a plurality of busbars each having a predetermined shape and length. Further, as shown in FIGS. 2-3 and 6, the intraphase bridging wires 44A-44I and the interphase bridging wires 45A-45G are arranged on the first coil end 41 of the stator coil 40 so as to protrude axially outward from the first coil end 41. In addition, it should be noted that for the sake of simplicity, the details of the turn portions of the electric wires 50 forming the first coil end 41 are not depicted in FIGS. 2-3 and 6.

Furthermore, in the present embodiment, the interphase bridging wire 45G, which electrically connects the neutral points N1 and N2 of the first and second winding sets as shown in FIG. 5, is made up of a first busbar 45G1, a second busbar 45G2 and a third busbar 45G3 as shown in FIG. 6. The first to the third busbars 45G1-45G3 are formed separately and joined to each other by, for example, welding.

Figure 7:
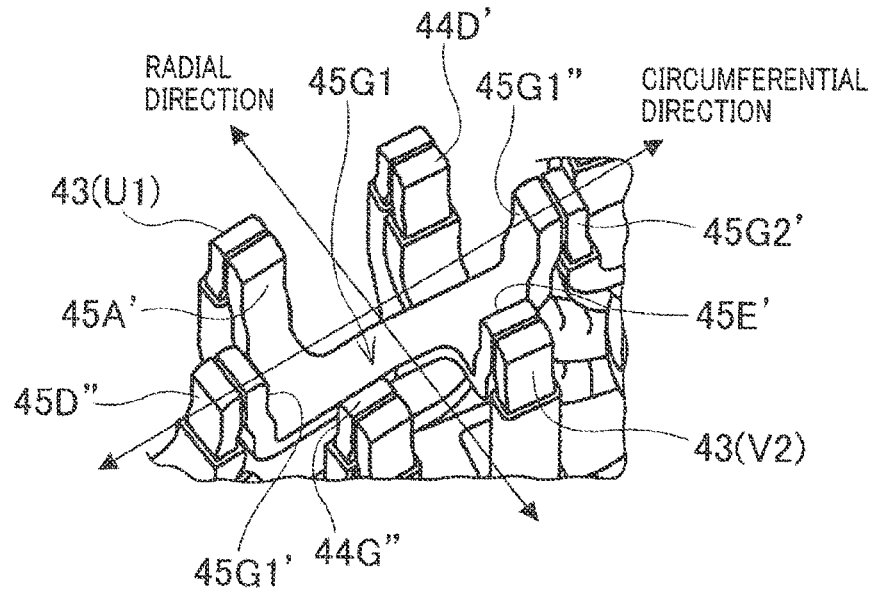
FIG. 7 is a perspective view illustrating the configuration of a first busbar included in the stator coil of the stator according to the first embodiment.

Specifically, the first busbar 45G1 is formed integrally with the interphase bridging wires 45A and 45E. As shown in FIGS. 6 and 7, the first busbar 45G1 has two connecting end portions (or terminal portions) 45A' and 45E' formed respectively in the interphase bridging wires 45A and 45E and two connecting end portions 45G1' and 45G1' joined respectively to the interphase bridging wire 45D and the second busbar 45G2. That is, the first busbar 45G1 is quadfurcated (i.e., divided into four branches) to have the four connecting end portions 45A', 45E', 45G1' and 45G1".

The connecting end portion 45G1' of the first busbar 45G1 has a side surface opposed and joined to a side surface of a connecting end portion 45D" of the interphase bridging wire 45D in the circumferential direction of the stator core 30. The side surface of the connecting end portion 45G1' makes up a joining surface of the connecting end portion 45G1' for being joined to the interphase bridging wire 45D. On the other hand, the connecting end portion 45G1" of the first busbar 45G1 has a side surface opposed and joined to a side surface of a connecting end portion 45G2' of the second busbar 45G2 in the circumferential direction of the stator core 30. The side surface of the connecting end portion 45G1" makes up a joining surface of the connecting end portion 45G1" for being joined to the second busbar 45G2.

That is, in the present embodiment, both the joining surfaces of the connecting end portions 45G1' and 45G" of the first busbar 45G1 face in the circumferential direction of the stator core 30. Further, the joining surfaces of the connecting end portions 45G1' and 45G" face away from each other in the circumferential direction. In other words, the joining surfaces of the connecting end portions 45G1' and 45G" respectively face circumferentially opposite sides of the first busbar 45G1.

Moreover, the connecting end portion 45A' of the first busbar 45G1 has a side surface opposed and joined to a side surface of a neutral point-side end portion of the neutral point-side winding segment 43 of the U-phase winding U1 in a radial direction of the stator core 30. The side surface of the connecting end portion 45A' makes up a joining surface of the connecting end portion 45A' for being joined to the neutral point-side winding segment 43 of the U-phase winding U1. On the other hand, the connecting end portion 45E' of the first busbar 45G1 has a side surface opposed and joined to a side surface of a neutral point-side end portion of the neutral point-side winding segment 43 of the V-phase winding V2 in the radial direction of the stator core 30. The side surface of the connecting end portion 45E' makes up a joining surface of the connecting end portion 45E' for being joined to the neutral point-side winding segment 43 of the V-phase winding V2.

That is, in the present embodiment, both the joining surfaces of the connecting end portions 45A' and 45E' of the first busbar 45G1 face in the radial direction of the stator core 30. Further, the joining surfaces of the connecting end portions 45A' and 45E' face away from each other in the radial direction. In other words, the joining surfaces of the connecting end portions 45A' and 45E' respectively face radially opposite sides of the first busbar 45G1.

The second busbar 45G2 has both the connecting end portion 45G2' joined to the first busbar 45G1 and a connecting end portion 45G2" joined to the third bus bar 45G3.

Figure 8:
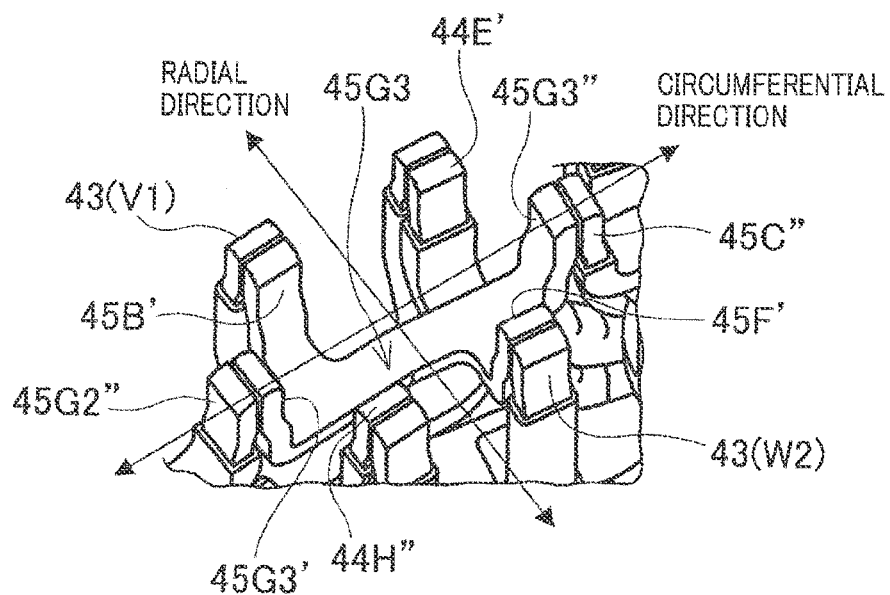
FIG. 8 is a perspective view illustrating the configuration of a third busbar included in the stator coil of the stator according to the first embodiment.

The third busbar 45G3 is formed integrally with the interphase bridging wires 45B and 45F. As shown in FIGS. 6 and 8, the third busbar 45G3 has two connecting end portions 45B' and 45F' formed respectively in the interphase bridging wires 45B and 45F and two connecting end portions 45G3' and 45G3" joined respectively to the second busbar 45G2 and the interphase bridging wire 45C. That is, the third busbar 45G3 is also quadfurcated to have the four connecting end portions 45B', 45F', 45G3' and 45G3".

The connecting end portion 45G3' of the third busbar 45G3 has a side surface opposed and joined to a side surface of the connecting end portion 45G2" of the second busbar 45G2 in the circumferential direction of the stator core 30. The side surface of the connecting end portion 45G3' makes up a joining surface of the connecting end portion 45G3' for being joined to the second busbar 45G2. On the other hand, the connecting end portion 45G3" of the third busbar 45G3 has a side surface opposed and joined to a side surface of a connecting end portion 45C" of the interphase bridging wire 45C in the circumferential direction of the stator core 30. The side surface of the connecting end portion 45G3" makes up a joining surface of the connecting end portion 45G3" for being joined to the interphase bridging wire 45C.

That is, in the present embodiment, both the joining surfaces of the connecting end portions 45G3' and 45G3" of the third busbar 45G3 face in the circumferential direction of the stator core 30. Further, the joining surfaces of the connecting end portions 45G3' and 45G3" face away from each other in the circumferential direction.

Moreover, the connecting end portion 45B' of the third busbar 45G3 has a side surface opposed and joined to a side surface of a neutral point-side end portion of the neutral point-side winding segment 43 of the V-phase winding V1 in a radial direction of the stator core 30. The side surface of the connecting end portion 45B' makes up a joining surface of the connecting end portion 45B' for being joined to the neutral point-side winding segment 43 of the V-phase winding V1. On the other hand, the connecting end portion 45F' of the third busbar 45G3 has a side surface opposed and joined to a side surface of a neutral point-side end portion of the neutral point-side winding segment 43 of the W-phase winding W2 in the radial direction of the stator core 30. The side surface of the connecting end portion 45F' makes up a joining surface of the connecting end portion 45F' for being joined to the neutral point-side winding segment 43 of the W-phase winding W2.

That is, in the present embodiment, both the joining surfaces of the connecting end portions 45B' and 45F' of the third bulbar 45G3 face in the radial direction of the stator core 30. Further, the joining surfaces of the connecting end portions 45B' and 45F' face away from each other in the radial direction.

In addition, it should be noted that in FIGS. 6-8, for each of the intraphase bridging wires 44A-44I and the interphase bridging wires 45A-45G, the superscript ['] is used to designate one connecting end portion of the bridging wire, and the superscript ["] is used to designate the other connecting end portion of the bridging wire.

The above-described stator 20 according to the present embodiment has the following advantages.

In the present embodiment, the stator 20 includes the annular stator core 30 and the three-phase stator coil 40. The stator core 30 has the slots 31 arranged in the circumferential direction of the stator core 30. The stator coil 40 is comprised of the phase windings U1-W1 and U2-W2 that are star-connected to define the neutral points N1 and N2 therebetween. The phase windings U1-W1 and U2-W2 are partially received in the slots 31 of the stator core 30 so that parts of the phase windings U1-W1 and U2-W2 are located outside the slots 31 to make up the pair of first and second coil ends 41 and 42 of the stator coil 40. The first and second coil ends 41 and 42 protrude respectively from the opposite pair of axial end faces of the stator core 30. The stator coil 40 further has the interphase bridging wires 45A-45G to electrically connect the neutral point-side ends of the phase windings U1-W1 and U2-W2 to each other. The interphase bridging wires 45A-45G are arranged on the first coil end 41 of the stator coil 40. Moreover, the interphase bridging wires 45A-45G are made up of the busbars. In particular, the interphase bridging wire 45G is made up of the first to the third busbars 45G1-45G3. The first bus bar 45G1 is quadfurcated to have the connecting end portions 45G1', 45G1", 45A' and 45E', the joining surfaces of which are respectively joined to the interphase bridging wire 45D, the second busbar 45G2, the U-phase winding U1 and the V-phase winding V2. Further, the joining surfaces of the connecting end portions 45G1' and 45G1" face in the circumferential direction of the stator core 30, while the joining surfaces of the connecting end portions 45A' and 45E' face in the radial direction of the stator core 30. On the other hand, the third bus bar 45G3 is also quadfurcated to have the four connecting end portions 45G3', 45G3", 45B' and 45F', the joining surfaces of which are respectively joined to the second busbar 45G2, the interphase bridging wire 45C, the V-phase winding V1 and the W-phase winding W2. Further, the joining surfaces of the connecting end portions 45G3' and 45G3" face in the circumferential direction of the stator core 30, while the joining surfaces of the connecting end portions 45B' and 45F' face in the radial direction of the stator core 30.

With the above configuration, it is possible to damp (or suppress) both circumferential vibration applied to the stator 20 due to rotation of the rotor 14 and radial vibration applied to the stator 20 due to unbalance of the rotor 14. Consequently, it is possible to secure high resistance of the stator coil 40 to both the circumferential and radial vibrations.

Further, in the present embodiment, the connecting end portions 45G1', 45G1", 45A' and 45E' of the first bus bar 45G1 are arranged so that the joining surfaces of the connecting end portions 45G1' and 45G1" face away from each other in the circumferential direction of the stator core 30, while the joining surfaces of the connecting end portions 45A' and 45E' face away from each other in the radial direction of the stator core 30. Moreover, the connecting end portions 45G3', 45G3", 45B' and 45F' of the third bus bar 45G3 are arranged so that the joining surfaces of the connecting end portions 45G3' and 45G3" face away from each other in the circumferential direction of the stator core 30, while the joining surfaces of the connecting end portions 45B' and 45F' face away from each other in the radial direction of the stator core 30.

With the above arrangement, it is possible to prevent the stator coil 40 from being twisted by either or both of the circumferential and radial vibrations. Consequently, it is possible to enhance the resistance of the stator coil 40 to both the circumferential and radial vibrations.

Second Embodiment

Figure 9:
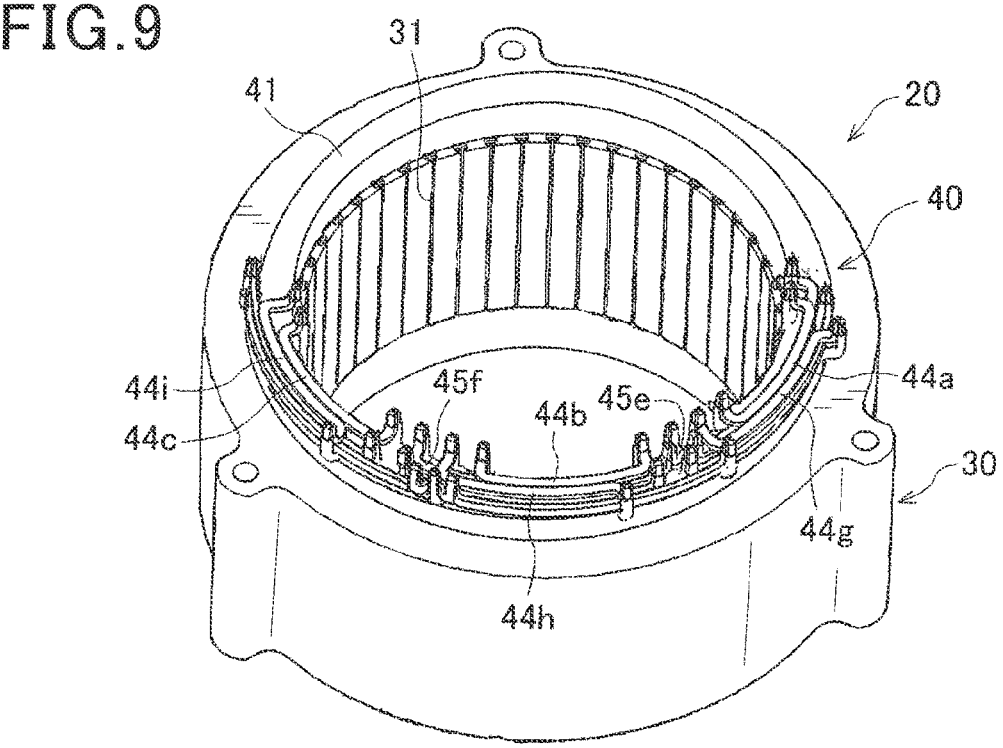
FIG. 9 is a perspective view of a stator according to a second embodiment omitting part of a coil end of a stator coil of the stator.
Figure 10:
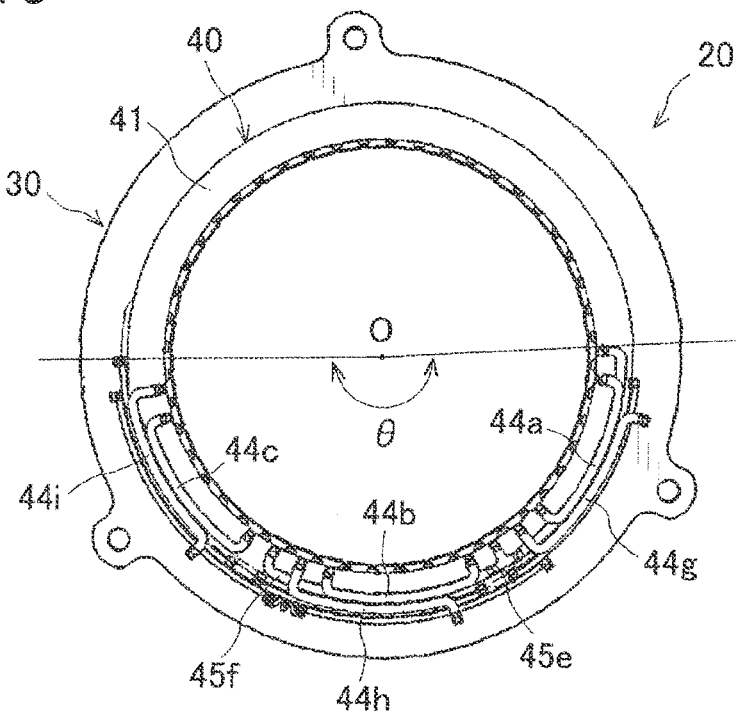
FIG. 10 is a plan view of the stator according to the second embodiment omitting part of the coil end of the stator coil.

FIGS. 9 and 10 show the overall configuration of a stator 20 according to a second embodiment.

In the present embodiment, the stator 20 includes a stator core 30, which is identical to the stator core 30 in the first embodiment, and a three-phase stator coil 40 that is slightly different from the stator coil 40 in the first embodiment.

Figure 11:
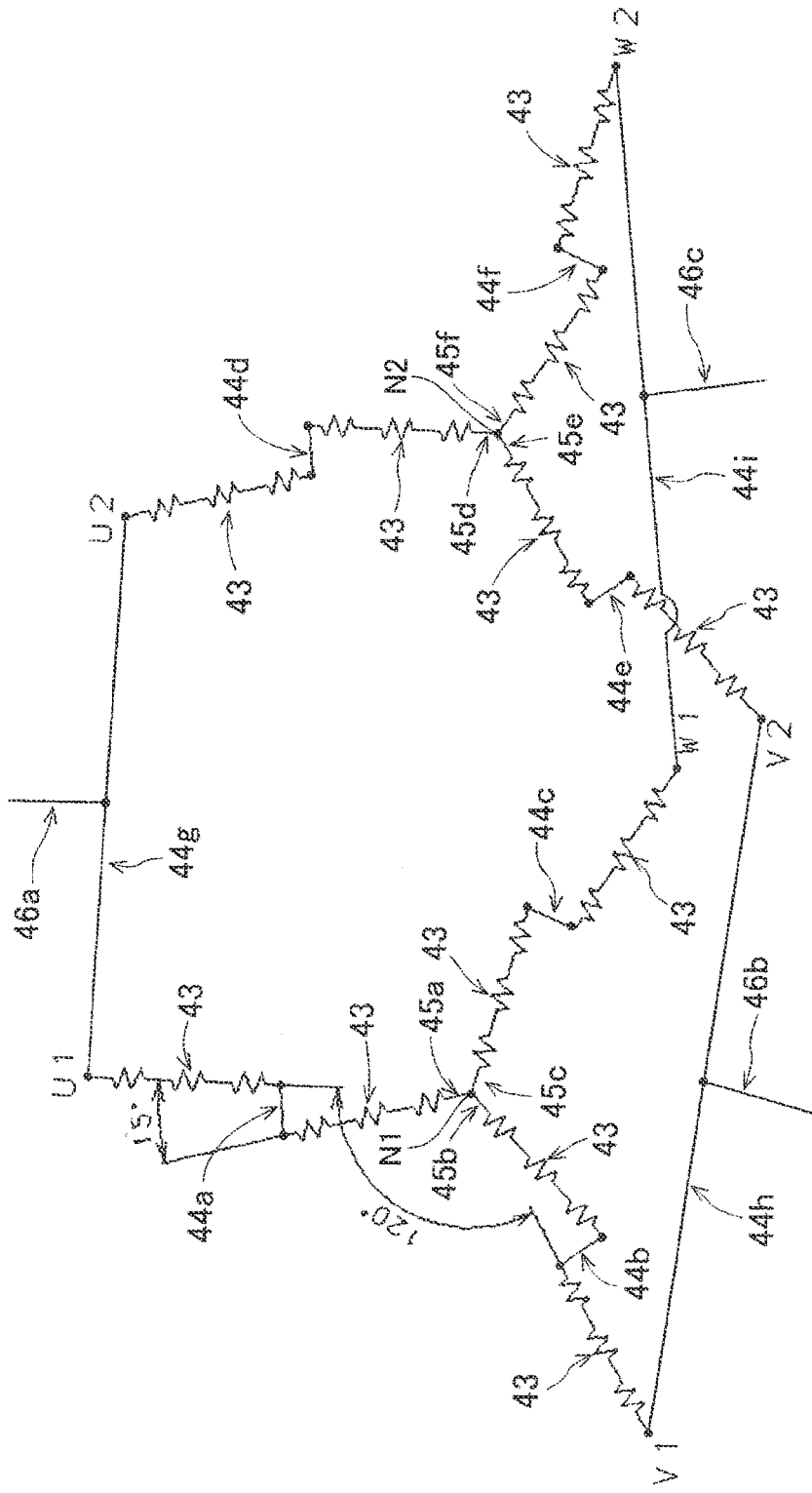
FIG. 11 is a schematic circuit diagram of the stator according to the second embodiment.

Specifically, in the present embodiment, as shown in FIG. 11, the stator coil 40 is comprised of first and second winding sets.

The first winding set consists of a U-phase winding U1, a V-phase winding V1 and a W-phase winding W1, which are star-connected to define a neutral point N1 therebetween. The U-phase, V-phase and W-phase windings U1, V1 and W1 are different in phase from each other by 120° in electrical angle. Moreover, each of the U-phase, V-phase and W-phase windings U1, V1 and W1 is comprised of a plurality of winding segments 43, more particularly of two winding segments 43 in the present embodiment. The two winding segments 43 are offset from each other by, for example, 15° in electrical angle.

Similarly, the second winding set consists of a U-phase winding U2, a V-phase winding V2 and a W-phase winding W2, which are star-connected to define a neutral point N2 therebetween. The U-phase, V-phase and W-phase windings U2, V2 and W2 are different in phase from each other by 120° in electrical angle. Moreover, each of the U-phase, V-phase and W-phase windings U2, V2 and W2 is comprised of a plurality of winding segments 43, more particularly of two winding segments 43 in the present embodiment. The two winding segments 43 are offset from each other by, for example, 15° in electrical angle.

That is, in the present embodiment, each of the U, V and W phases of the stator coil 40 is made up of four winding segments 43.

Moreover, in the present embodiment, the stator coil 40 has a plurality of intraphase bridging wires 44a-44i each of which bridges a corresponding pair of the winding segments 43 belonging to a same one of the U, V and W phases.

Specifically, the intraphase bridging wire 44a bridges the two winding segments 43 of the U-phase winding U1 in the first winding set. The intraphase bridging wire 44b bridges the two winding segments 43 of the V-phase winding V1 in the first winding set. The intraphase bridging wire 44c bridges the two winding segments 43 of the W-phase winding W1 in the first winding set. The intraphase bridging wire 44d bridges the two winding segments 43 of the U-phase winding U2 in the second winding set. The intraphase bridging wire 44e bridges the two winding segments 43 of the V-phase winding V2 in the second winding set. The intraphase bridging wire 44f bridges the two winding segments 43 of the W-phase winding W2 in the second winding set.

Moreover, the intraphase bridging wire 44g bridges the output-side winding segment 43 of the U-phase winding U1 in the first winding set and the output-side winding segment 43 of the U-phase winding U2 in the second winding set. The intraphase bridging wire 44h bridges the output-side winding segment 43 of the V-phase winding V1 in the first winding set and the output-side winding segment 43 of the V-phase winding V2 in the second winding set. The intraphase bridging wire 44i bridges the output-side winding segment 43 of the W-phase winding W1 in the first winding set and the output-side winding segment 43 of the W-phase winding W2 in the second winding set.

Further, the intraphase bridging wire 44g is electrically connected with an output lead wire 46a. The intraphase bridging wire 44h is electrically connected with an output lead wire 46b. The intraphase bridging wire 44i is electrically connected with an output lead wire 46c.

Furthermore, in the present embodiment, the stator coil 40 also has a plurality of interphase bridging wires 45a-45f for electrically connecting neutral point-side ends of the phase windings U1-W1 and U2-W2 to each other.

Specifically, the interphase bridging wire 45a electrically connects the neutral point-side end of the neutral point-side wire segment 43 of the U-phase winding U1 to the neutral point N1 in the first winding set. The interphase bridging wire 45b electrically connects the neutral point-side end of the neutral point-side wire segment 43 of the V-phase winding V1 to the neutral point N1 in the first winding set. The interphase bridging wire 45c electrically connects the neutral point-side end of the neutral point-side wire segment 43 of the W-phase winding W1 to the neutral point N1 in the first winding set. The interphase bridging wire 45d electrically connects the neutral point-side end of the neutral point-side wire segment 43 of the U-phase winding U2 to the neutral point N2 in the second winding set. The interphase bridging wire 45e electrically connects the neutral point-side end of the neutral point-side wire segment 43 of the V-phase winding V2 to the neutral point N2 in the second winding set. The interphase bridging wire 45f electrically connects the neutral point-side end of the neutral point-side wire segment 43 of the W-phase winding W2 to the neutral point N2 in the second winding set.

However, in the present embodiment, the stator coil 40 has no interphase bridging wire electrically connecting the neutral point N1 in the first winding set to the neutral point N2 in the second winding set, unlike in the first embodiment.

In addition, in the present embodiment, the electrical connection between the winding segments 43 of the phase windings U1-W1 and U2-W2, the intraphase bridging wires 44a-44i and the interphase bridging wires 45a-45f is made by, for example, welding.

Figure 12:
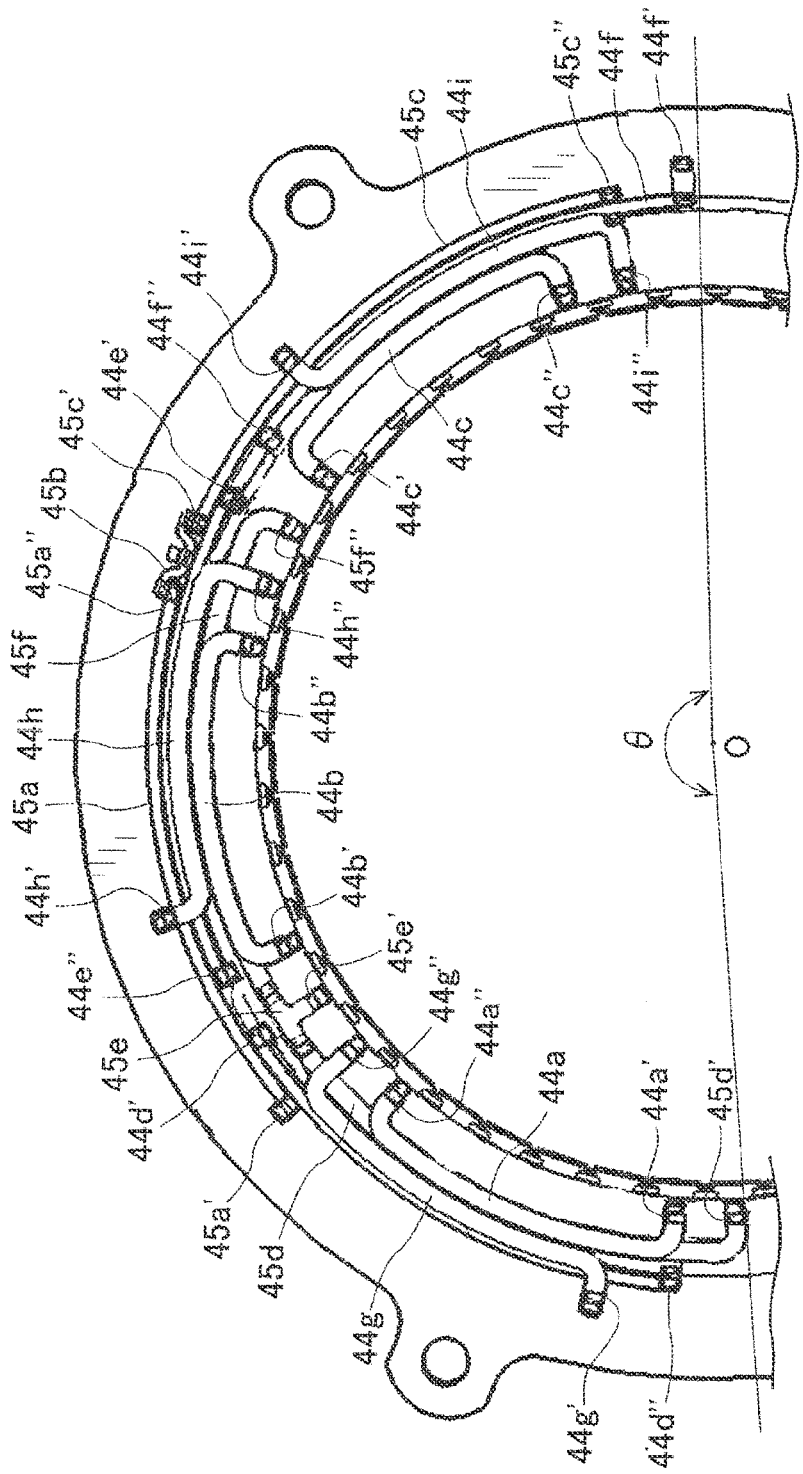
FIG. 12 is a plan view of part of the stator according to the second embodiment.

Moreover, in the present embodiment, the intraphase bridging wires 44a-44i and the interphase bridging wires 45a-45f are made up of a plurality of busbars each having a predetermined shape and length. Further, as shown in FIGS. 9-10 and 12, the intraphase bridging wires 44a-44i and the interphase bridging wires 45a-45f are arranged on the first coil end 41 of the stator coil 40 so as to protrude axially outward from the first coil end 41. In addition, it should be noted that for the sake of simplicity, the details of the turn portions of the electric wires 50 forming the first coil end 41 are not depicted in FIGS. 9-10 and 12.

Figure 13:
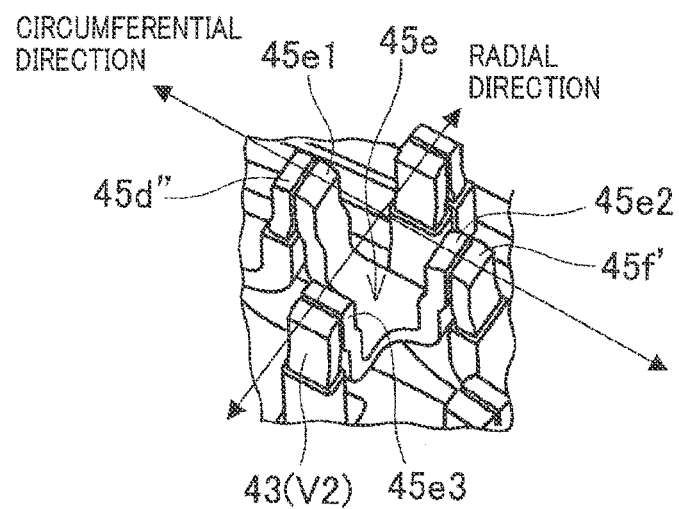
FIG. 13 is a perspective view illustrating the configuration of a busbar included in the stator coil of the stator according to the second embodiment.

Furthermore, in the present embodiment, as shown in FIGS. 12 and 13, the interphase bridging wire 45e is made up of a busbar that is trifurcated (i.e., divided into three branches) to have three connecting end portions 45e1, 45e2 and 45e3.

The connecting end portion 45e1 is formed at one circumferential end of the interphase bridging wire 45e. The connecting end portion 45e1 has a side surface opposed and joined to a side surface of a connecting end portion 45d" of the interphase bridging wire 45d in the circumferential direction of the stator core 30. The side surface of the connecting end portion 45e1 makes up a joining surface of the connecting end portion 45e1 for being joined to the interphase bridging wire 45d.

The connecting end portion 45e2 is formed at the other circumferential end of the interphase bridging wire 45e. The connecting end portion 45e2 has a side surface opposed and joined to a side surface of a connecting end portion 45f' of the interphase bridging wire 45f in the circumferential direction of the stator core 30. The side surface of the connecting end portion 45e2 makes up a joining surface of the connecting end portion 45e2 for being joined to the interphase bridging wire 45f.

That is, in the present embodiment, both the joining surfaces of the connecting end portions 45e1 and 45e2 face in the circumferential direction of the stator core 30. Further, the joining surfaces of the connecting end portions 45e1 and 45e2 face away from each other in the circumferential direction. In other words, the joining surfaces of the connecting end portions 45e1 and 45e2 respectively face circumferentially opposite sides of the interphase bridging wire 45e.

On the other hand, the connecting end portion 45e3 is formed at a radially inner end of the interphase bridging wire 45e. The connecting end portion 45e3 has a side surface opposed and joined to a side surface of a neutral point-side end portion of the neutral point-side winding segment 43 of the V-phase winding V2 in a radial direction of the stator core 30. The side surface of the connecting end portion 45e3 makes up a joining surface of the connecting end portion 45e3 for being joined to the neutral point-side winding segment 43 of the V-phase winding V2.

That is, in the present embodiment, the joining surface of the connecting end portion 45e3 faces inward in the radial direction of the stator core 30.

In addition, it should be noted that in FIGS. 12 and 13, for each of the intraphase bridging wires 44a-44i and the interphase bridging wires 45a-45f, the superscript ['] is used to designate one connecting end portion of the bridging wire, and the superscript ["] is used to designate the other connecting end portion of the bridging wire.

The above-described stator 20 according to the present embodiment has almost the same advantages as the stator 20 according to the first embodiment.

Specifically, in the present embodiment, the interphase bridging wire 45e is made up of the single busbar that is trifurcated to have the connecting end portions 45e1, 45e2 and 45e3, the joining surfaces of which are respectively joined to the interphase bridging wires 45d and 45f and the V-phase winding V2. Further, the joining surfaces of the connecting end portions 45e1 and 45e2 face in the circumferential direction of the stator core 30, while the joining surface of the connecting end portion 45e3 faces in the radial direction of the stator core 30.

With the above configuration, it is possible to damp both circumferential vibration applied to the stator 20 due to rotation of the rotor 14 and radial vibration applied to the stator 20 due to unbalance of the rotor 14. Consequently, it is possible to secure high resistance of the stator coil 40 to both the circumferential and radial vibrations.

Further, in the present embodiment, the connecting end portions 45e1 and 45e2 are arranged so as to have their respective joining surfaces facing away from each other in the circumferential direction of the stator core 30.

With the above arrangement, it is possible to prevent the stator coil 40 from being twisted by the radial vibration. Consequently, it is possible to enhance the resistance of the stator coil 40 to the radial vibration.

While the above particular embodiments have been shown and described, it will be understood by those skilled in the art that various modifications, changes, and improvements may be made without departing from the spirit of the present invention.

For example, in the previous embodiments, the joining surfaces of the connecting end portions of the interphase bridging wires face either in the circumferential direction of the stator core 30 or in the radial direction of the stator core 30.

However, the joining surfaces of the connecting end portions of the interphase bridging wires may face either substantially in the circumferential direction of the stator core 30 or substantially in the radial direction of the stator core 30. Here, the term "substantially in the circumferential direction" denotes both exactly in the circumferential direction and deviated from the circumferential direction to the extent of not considerably lowering the vibration resistance of the stator coil 40; the term "substantially in the radial direction" denotes both exactly in the radial direction and deviated from the radial direction to the extent of not considerably lowering the vibration resistance of the stator coil 40.

In the second embodiment, the connecting end portions 45e1-45e3 are arranged so that the joining surfaces of the connecting end portions 45e1 and 45e2 face away from each other in the circumferential direction of the stator core 30, while the joining surface of the connecting end portion 45e3 faces in the radial direction of the stator core 30.

However, the connecting end portions 45e1-45e3 may also be arranged so that two of the joining surfaces of the connecting end portions 45e1-45e3 face away from each other in the radial direction of the stator core 30, while the remaining joining surface faces in the circumferential direction of the stator core 30.

In the previous embodiments, the electrical connection between the winding segments of the phase windings, the intraphase bridging wires and the interphase bridging wires is made by welding. However, the electrical connection may also be made by other conventional methods, such as soldering.

In the previous embodiments, all the interphase bridging wires are made up of the busbars. However, it is also possible that only one or some of the interphase bridging wires are made up of busbars.

What is claimed is:

1. A stator for a rotating electric machine, the stator comprising:
   an annular stator core having a plurality of slots arranged in a circumferential direction of the stator core; and
   a three-phase stator coil comprised of a plurality of phase windings that are star-connected to define at least one neutral point therebetween, the phase windings being partially received in the slots of the stator core so that parts of the phase windings are located outside the slots to make up a pair of coil ends of the stator coil, the coil ends protruding respectively from an opposite pair of axial end faces of the stator core,
   wherein
   the stator coil further has a plurality of interphase bridging conductors to electrically connect neutral point-side ends of the phase windings to each other, the interphase bridging conductors being arranged on one of the coil ends of the stator coil,
   at least one of the interphase bridging conductors is formed of at least one busbar,
   the busbar is configured to include three or four connecting end portions each having a single flat joining surface joined to one of the phase windings, other bridging conductors and other busbars,
   the connecting end portions are arranged so that some of the flat joining surfaces of the connecting end portions face substantially in the circumferential direction of the stator core, and the other flat joining surfaces face substantially in a radial direction of the stator core.

2. The stator as set forth in claim 1, wherein the three or four connecting end portions include a pair of the connecting end portions which are arranged so as to have their respective joining surfaces facing away from each other substantially in one of the circumferential and radial directions of the stator core.

3. The stator as set forth in claim 1, wherein the busbar is configured to include first and second pairs of the connecting end portions,
   the first pair of the connecting end portions are arranged so as to have their respective joining surfaces facing away from each other substantially in the circumferential direction of the stator core, and
   the second pair of the connecting end portions are arranged so as to have their respective joining surfaces facing away from each other substantially in the radial direction of the stator core.

\* \* \* \* \*